US 8,467,730 B2

(12) United States Patent
Kondo

(10) Patent No.: US 8,467,730 B2
(45) Date of Patent: Jun. 18, 2013

(54) RADIO COMMUNICATION METHOD, BASE STATION APPARATUS AND TERMINAL APPARATUS IN RADIO COMMUNICATION SYSTEM, AND RADIO COMMUNICATION SYSTEM

(75) Inventor: Taiji Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 330 days.

(21) Appl. No.: 12/837,626

(22) Filed: Jul. 16, 2010

(65) Prior Publication Data

US 2011/0021221 A1  Jan. 27, 2011

(30) Foreign Application Priority Data

Jul. 27, 2009  (JP) ................. 2009-174280

(51) Int. Cl.
*H04B 15/00* (2006.01)
(52) U.S. Cl.
USPC ................................................. 455/63.1
(58) Field of Classification Search
USPC ............. 455/450, 443, 444, 448, 63.1, 114.2, 455/278.1, 296
See application file for complete search history.

(56) References Cited

U.S. PATENT DOCUMENTS

| 6,999,725 | B2 | 2/2006 | Nitta et al. |
| 7,979,078 | B2 | 7/2011 | Tiedemann, Jr. et al. |
| 2008/0008147 | A1 | 1/2008 | Nakayama |
| 2009/0227263 | A1* | 9/2009 | Agrawal et al. ............ 455/452.1 |

FOREIGN PATENT DOCUMENTS

| JP | 2002-262344 A | 9/2002 |
| JP | 2003-018073 A | 1/2003 |
| JP | 2003-250177 A | 9/2003 |
| JP | 2005-303828 A | 10/2005 |
| JP | 2007-526663 A | 9/2007 |
| JP | 2008-017325 A | 1/2008 |

OTHER PUBLICATIONS

Japanese Office Action mailed Mar. 19, 2013 for corresponding Japanese Application No. 2009-174280, with Partial English-language Translation.

* cited by examiner

*Primary Examiner* — Tu X Nguyen
(74) *Attorney, Agent, or Firm* — Fujitsu Patent Center

(57) ABSTRACT

A radio communication method for performing a radio communication between a first and second movable base station apparatuses and a subordinate terminal apparatus respectively, the method including: transmitting and receiving configuration information relating radio resource and load information relating the subordinate terminal apparatus in the first and second base station apparatuses respectively, via the terminal apparatus located in an overlapped communicable range of the first and second base station apparatuses, when the first and second base station apparatuses perform radio communication using the same radio resource, by the first and second base station apparatuses respectively; and performing interference control based on the configuration information and the load information, by the first and second base station apparatuses respectively.

9 Claims, 8 Drawing Sheets

EXAMPLE OF EXCLUSIVE INTERFERENCE CONTROL PATTERN

RADIO COMMUNICATION METHOD, BASE STATION APPARATUS AND TERMINAL APPARATUS IN RADIO COMMUNICATION SYSTEM, AND RADIO COMMUNICATION SYSTEM

CROSS-REFERENCE TO RELATED APPLICATIONS

This application is based upon and claims the benefit of priority of the prior Japanese Patent Application No. 2009-174280, filed on Jul. 27, 2009, the entire contents of which are incorporated herein by reference.

FIELD

The embodiments discussed herein are related to a radio communication method, base station apparatus and terminal apparatus in a radio communication system, and the radio communication system.

BACKGROUND

The following prior arts relating to radio communication are discussed. One example is an operation control system method for a mobile base station which is connected to a mobile communication system via a radio relay line, the method including: an interference estimation basic information acquisition procedure for the mobile base station, which acquires estimation basic information for estimating the radio interference state with another base station; an interference estimation procedure which estimates the radio interference state between the mobile base station and another base station based on the acquired estimation basic information; and a control procedure which controls operation of the mobile base station based on the estimated radio interference state (e.g. see Japanese Laid-open Patent Publication No. 2003-18073).

Another example is a radio communication system including: a radio base station, and a radio terminal apparatus which belongs to the radio base station and performs radio communication, wherein the radio terminal apparatus detects a radio apparatus to be an interference source which generates radio interference with the radio waves emitted from the belonging radio base station, sends a control signal to avoid the generation of radio interference to the radio apparatus to be the interference source, and the radio apparatus to be the interference source performs control to avoid the radio interference when the control signal is received from the radio terminal apparatus (e.g. see Japanese Laid-open Patent Publication No. 2008-17325).

However, the content discussed in the above Japanese Laid-open Patent Publication No. 2003-18073 and Japanese Laid-open Patent Publication No. 2008-17325, relates to a certain base station performing interference control to another base station to avoid interference. In this case, the certain base station can use all the allocated radio resource, but the other base station may not be able to use a part of the allocated radio resource because of interference control.

SUMMARY

According to an aspect of the invention, a radio communication method for performing a radio communication between a first and second movable base station apparatuses and a subordinate terminal apparatus respectively, the method including: transmitting and receiving configuration information relating radio resource and load information relating the subordinate terminal apparatus in the first and second base station apparatuses respectively, via the terminal apparatus located in an overlapped communicable range of the first and second base station apparatuses, when the first and second base station apparatuses perform radio communication using the same radio resource, by the first and second base station apparatuses respectively; and performing interference control based on the configuration information and the load information, by the first and second base station apparatuses respectively.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the invention will now be described.

First Embodiment

Figure 1:
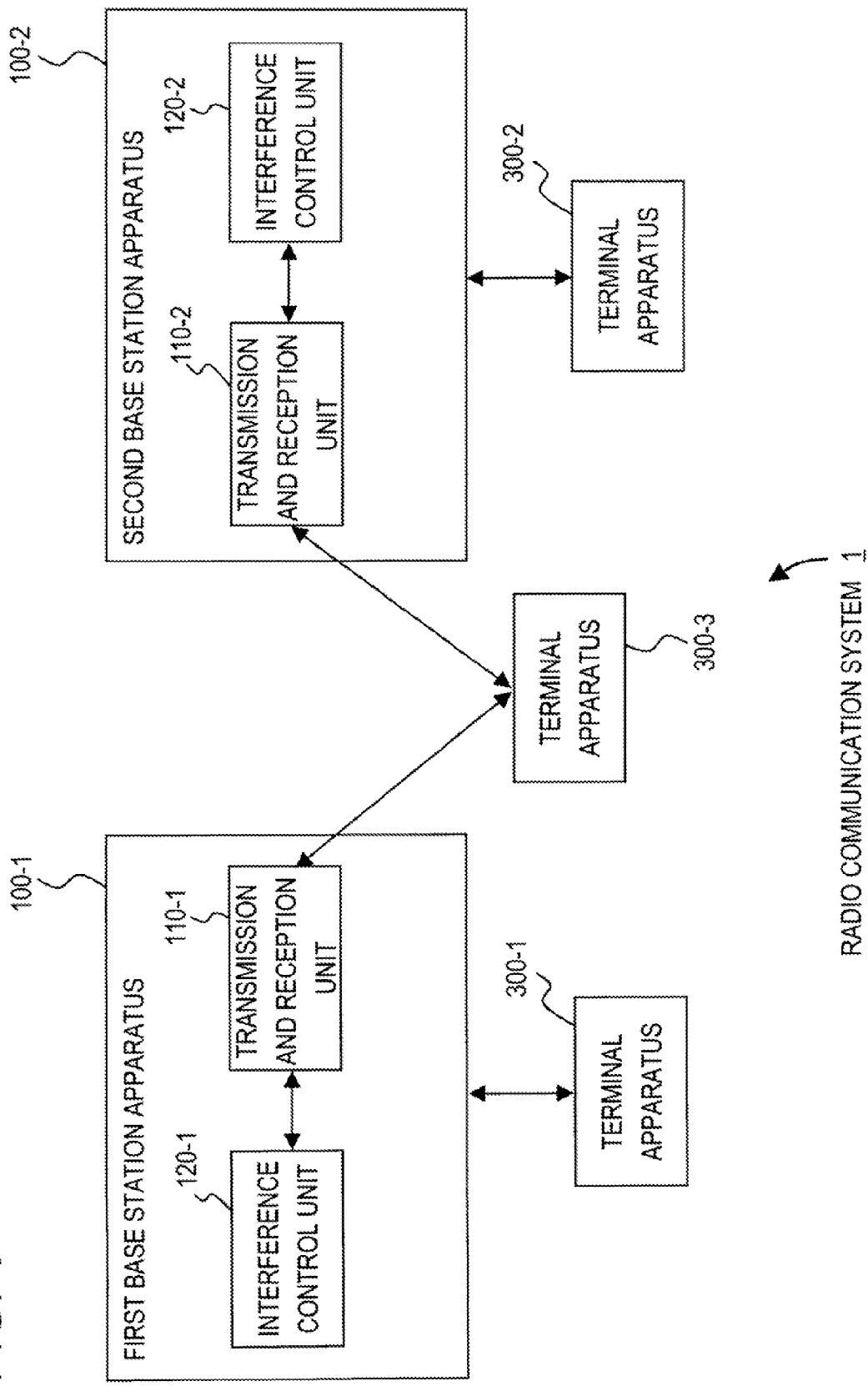
FIG. 1 is a diagram depicting a configuration example of a radio communication system.

A first embodiment will be described. FIG. 1 is a diagram depicting a configuration example of a radio communication system 1. In a radio communication system 1 which performs radio communication between the first and second movable base station apparatuses 100-1 and 100-2 and the subordinate terminal apparatuses 300-1 to 300-3, the first and second base station apparatuses 100-1 and 100-2 includes: a transmission and reception unit 110-1 or 110-2 which mutually transmit and receive configuration information relating to radio resource and load information relating to the subordinate terminal apparatuses 300-1 and 300-2 in the first and second base station apparatuses 100-1 and 100-2 respectively, via the terminal apparatus 300-3 located in the overlapped communicable range of the first and second base station apparatuses 100-1 and 100-2, when the radio communication is performed using the same radio resource; and the interference control units 120-1 and 120-2 which perform interference control based on the configuration information and the load information.

The transmission and reception unit 110-1 of the first base station apparatus 100-1 transmits the configuration information and load information relating the first base station apparatus 100-1 to the second base station apparatus 100-2 via the terminal apparatus 300-3.

The transmission and reception unit 110-2 of the second base station apparatus 100-2 transmits the configuration information and load information relating to the second base station apparatus 100-2 to the first base station apparatus 100-1 via the terminal apparatus 300-3.

Each interference control unit 120-1 and 120-2 performs interference control based on the shared configuration information and load information.

In this way, according to the first embodiment, the first and second base station apparatuses 100-1 and 100-2 mutually transmit and receive the configuration information and load information, so as to share the configuration information and load information. Then the first and second base station apparatuses perform interference control with sharing the respective configuration information and load information. As a result, the first embodiment can avoid the possibility of the generation of a state where a part of the radio resources allocated only to the first or the second base station apparatus 100-1 or 100-2 cannot be used because information is not shared, and can effectively utilize the radio resources. Interference can also be avoided by performing the interference control.

Second Embodiment

Figure 2:
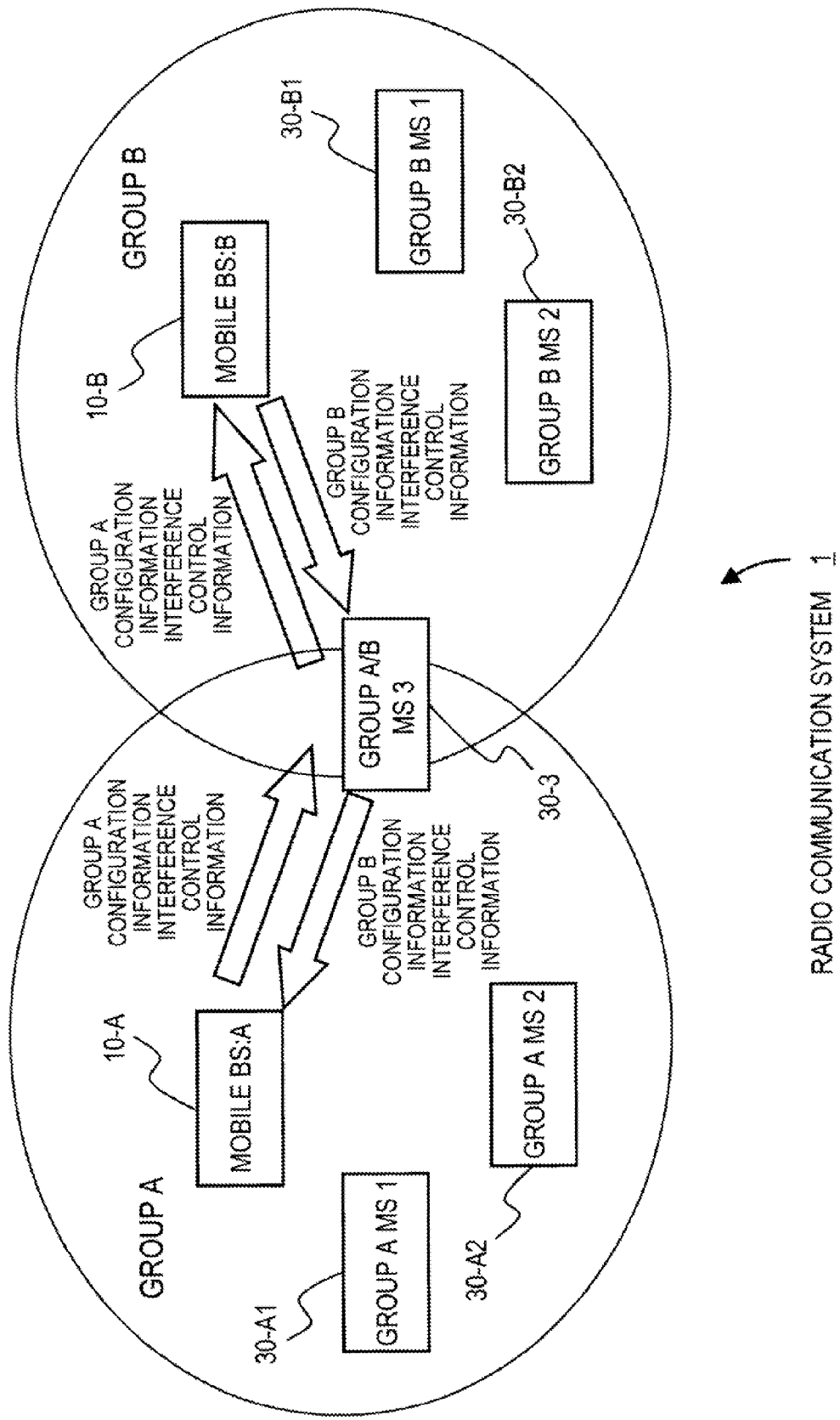
FIG. 2 is a diagram depicting a configuration example of a radio communication system.

FIG. 2 is a diagram depicting a configuration example of the radio communication system 1. The radio communication system 1 includes mobile base station apparatuses (hereafter "mobile base stations") 10-A and 10-B, and terminal apparatuses (hereafter "terminals") 30-A1, 30-A2, 30-3, 30-B1, and 30-B2.

The mobile stations 10-A and 10-B are movable base station apparatuses, and can perform radio communication with the terminal 30-A1 or the like in the communicable range. In the example illustrated in FIG. 2, the mobile base station 10-A can perform radio communication with three terminals 30-A1, 30-A2, and 30-3. The mobile base station 10-B can perform radio communication with three terminals 30-B1, 30-B2, and 30-3.

In the present embodiment, the communicable range of the mobile base station 10-A is called "group A", and the communicable range of the mobile base station 10-B is called "group B". The terminal 30-3 can perform radio communication with the mobile base stations 10-A and 10-B in the two groups A and B.

Figure 3:
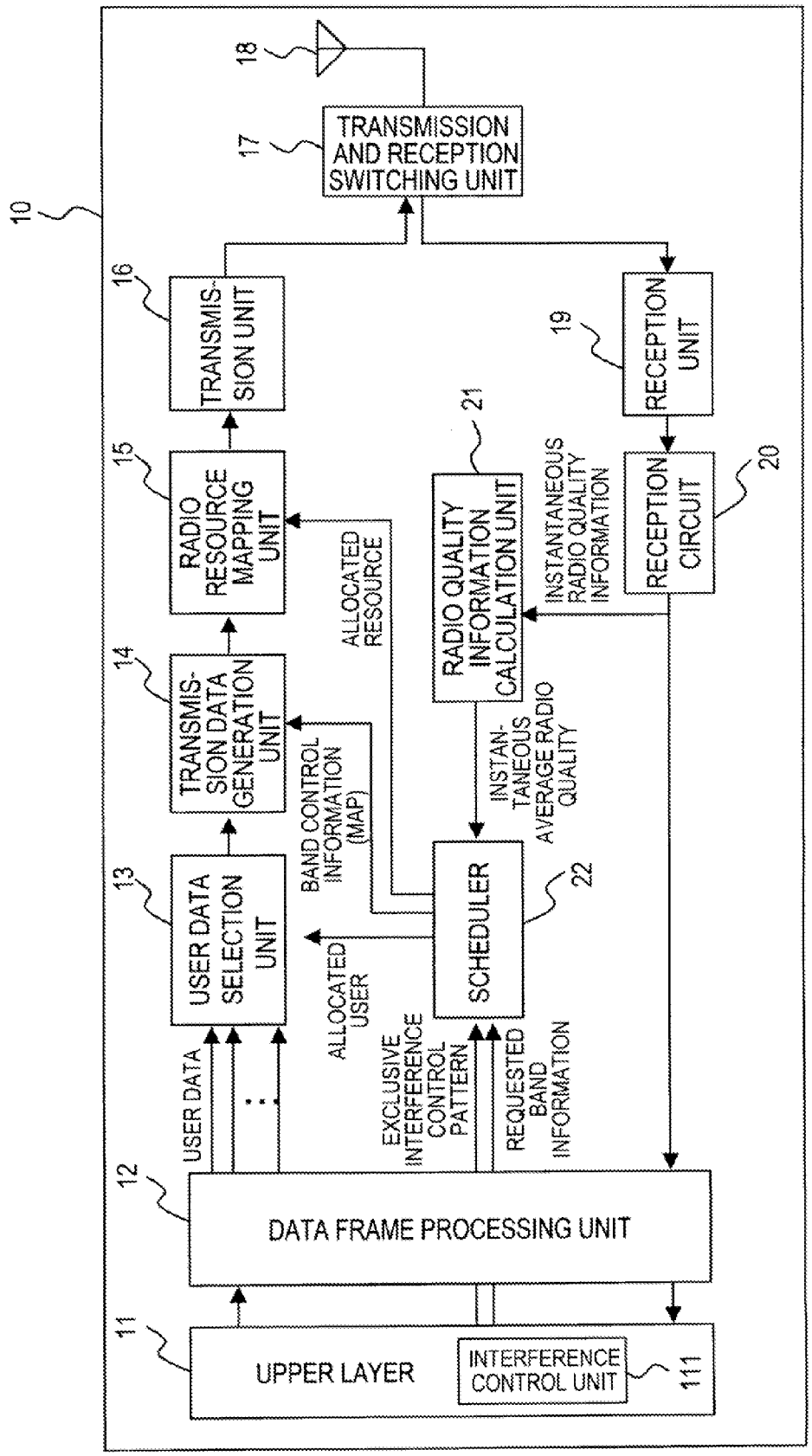
FIG. 3 is a diagram depicting a configuration example of a base station apparatus.

FIG. 3 is a diagram depicting a configuration example of the mobile base station 10. The mobile base station 10 includes an upper layer 11, a data frame processing unit 12, a user data selection unit 13, a transmission data generation unit 14, a radio resource mapping unit 15, a transmission unit 16, a transmission and reception switching unit 17, an antenna 18, a reception unit 19, a reception circuit 20, a radio quality information calculation unit 21, and a scheduler 22.

The transmission and reception units 110-1 and 110-2 in the first embodiment, for example, correspond to the data frame processing unit 12 to the scheduler 22, and the interference control units 120-1 and 120-2 correspond to the upper layer 11 and the interference control unit 111.

The upper layer 11 performs various processing on user data and so on. The upper layer 11 further includes an interference control unit 111. The interference control unit 111 generates an exclusive interference control pattern based on the configuration information and load information, and outputs to the scheduler 22. Details are described later.

The data frame processing unit 12 frames such data as user data, which is output from the upper layer 11, and outputs to the user data selection unit 13. The data frame processing unit 12, for example, performs deframe to the user data which is output from the reception circuit 20, and outputs the user data within the frame to the upper layer 111.

The user data selection unit 13 selects user data for an assigned user, and outputs to the transmission data generation unit 14 in accordance with control of the scheduler 22.

The transmission data generation unit 14 generates transmission data, including MAP information (or allocated resource information or band control information) output from the scheduler 22, and the selected user data. The transmission data generation unit 14 outputs the generated transmission data to the radio resource mapping unit 15.

The radio resource mapping unit 15 maps the transmission data in an allocated transmission area in the radio frame, according to the MAP information from the scheduler 22, and outputs to the transmission unit 16.

The transmission unit 16 performs such processing as encoding and modulation on the output from the radio resource mapping unit 15 according to the scheduling determined by the scheduler 22, and outputs the result as a radio signal.

The transmission and reception switching unit 17 switches the output of the radio signal from the transmission unit 16 to the antenna 18, and the output of the radio signal received by the antenna 18 to the reception unit 19.

The antenna 18 transmits and receives the radio signal to and from the terminal 30.

The reception unit 19 performs, for example, such processing as demodulation and decoding on the radio signal output from the transmission and reception switching unit 17, according to the scheduling determined by the scheduler 22, and outputs the result to the reception circuit 20 as the received data.

The reception circuit 20 extracts user data or instantaneous radio quality information from the received data, and outputs the user data to the data frame processing unit 12, and the instantaneous radio quality information to the radio quality information calculation unit 21. The instantaneous radio quality information is, for example, quality information which is measured and transmitted by the terminal 30 based on the pilot signal transmitted from the mobile base station 10. The reception circuit 20 may also measure the instantaneous radio quality information based on the pilot signal from the terminal 30, received by the reception unit 19, and outputs to the radio quality information calculation unit 21.

The radio quality information calculation unit 21 calculates the average radio quality based on the instantaneous radio quality information which is received for a predetermined time, and outputs the average radio quality information and the instantaneous radio quality information to the scheduler 22.

The scheduler 22 performs scheduling such as radio resource allocation, based on the exclusive interference control pattern and the requested band information (or load information) which are output from the higher layer 11, and the average and instantaneous radio quality information, which are output from the radio line quality information calculation unit 21.

Figure 4:
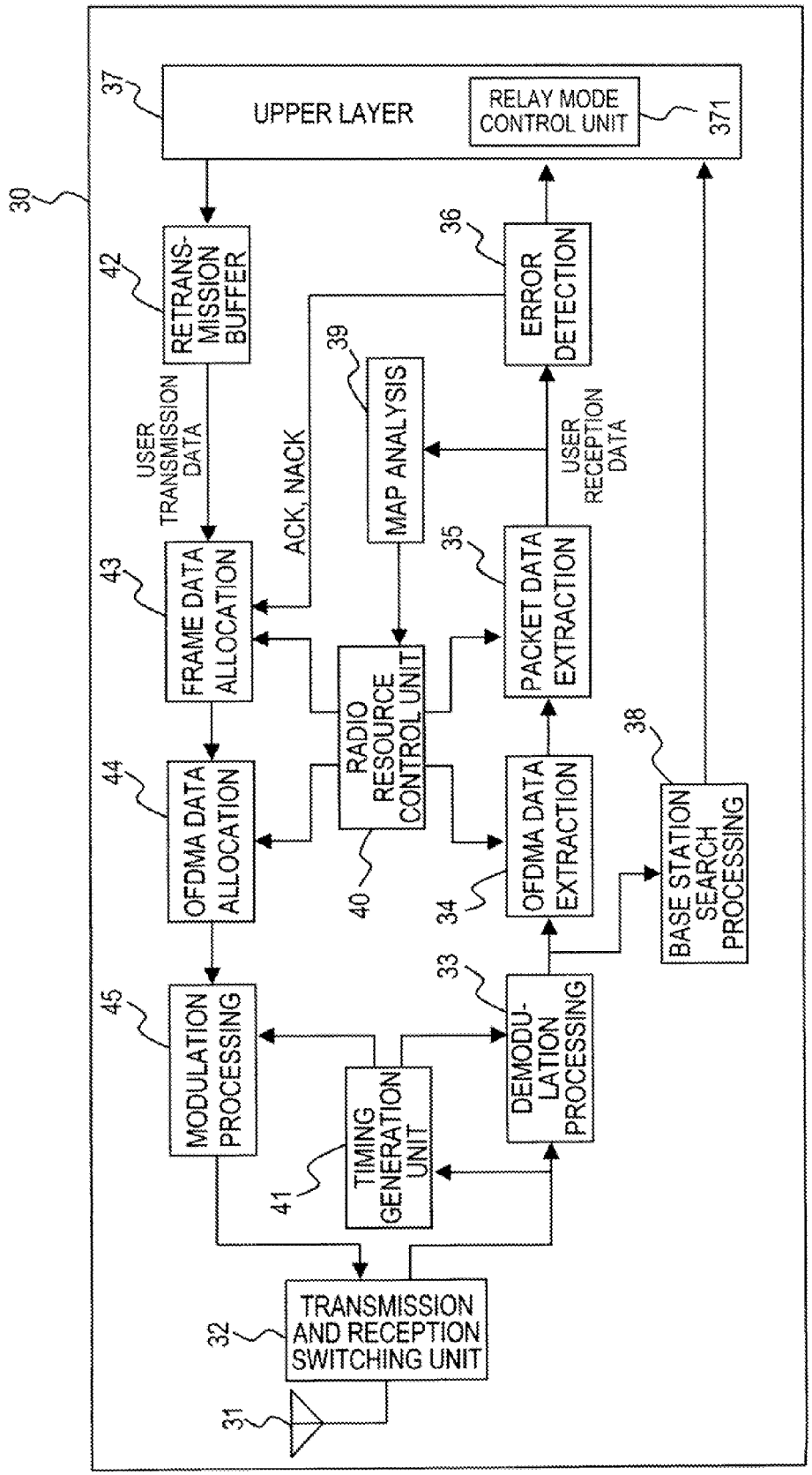
FIG. 4 is a diagram depicting a configuration example of a terminal apparatus.

FIG. 4 is a diagram depicting a configuration example of the terminal 30. The terminal 30 includes an antenna 31, a transmission and reception switching unit 32, a demodulation processing unit 33, an OFDMA data extraction unit 34, a packet data extraction unit 35, an error detection unit 36, an upper layer 37, a base station search processing unit 38, a MAP analysis unit 39, a radio resource control unit 40, a timing generation unit 41, a retransmission buffer 42, a frame data allocation unit 43, an OFDMA data allocation unit 44, and a modulation processing unit 45.

The antenna 31 transmits and receives radio signal to and from the mobile base station 10.

The transmission and reception switching unit 32 switches the output of the radio signal received by the antenna 31 to the demodulation processing unit 33, and the output of the radio signal output from the modulation processing unit 45 to the antenna 31.

The demodulation processing unit 33 performs demodulation processing to the radio signal which is output from the transmission and reception switching unit 32, according to the timing information which is output from the timing generation unit 41. The demodulation processing unit 33 outputs the radio signal after demodulation such as the received data.

The OFDMA data extraction unit 34 extracts from the received data OFDMA data included in the radio resource allocated to the terminal 30, based on the control by the radio resource control unit 40.

The packet data extraction unit 35 extracts the user data and MAP information from the OFDMA data based on the control from the radio resource control unit 40. The packet data extraction unit 35 outputs the user data to the error detection unit 36, and outputs the MAP information to the MAP analysis unit 39.

The error detection unit 36 detects an error of the user data, and generates, for example, a NACK signal if there is an error or an ACK signal is there is no error, and outputs it to the frame data allocation unit 43. The error detection unit 36 outputs the user data after error detection to the upper layer 37.

The upper layer 37 performs various processing to the user data. The upper layer 37 further includes a relay mode control unit 371. The relay mode control unit 371 calculates interference based on the search processing result by the base station search processing unit 38. Details are described later.

The base station search processing unit 38 performs base station search (or cell search) processing based on the pilot signal (or a known signal) transmitted from the mobile base station 10. The base station search processing unit 38 outputs the result of the cell search to the relay mode control unit 371.

The MAP analysis unit 39 analyses the MAP information, and outputs the analysis result to the radio resource control unit 40.

The radio resource control unit 40 controls the OFDMA data extraction unit 34 and the packet data extraction unit 35 based on the MAP information, so that data reception is performed in the radio resource allocated to the terminal 30. The radio resource control unit 40 also controls the frame data allocation unit 43 and the OFDMA data allocation unit 44, so that data transmission processing is performed in this radio resource.

The timing generation unit 41 generates timing signal to be the transmission timing or reception timing of the radio signal based on the MAP information included in the radio signal, and outputs it to the demodulation processing unit 33 and modulation processing unit 45.

The retransmission buffer 42 temporarily stores user data output from the upper layer 37. The retransmission buffer 42, for example, temporarily stores the user data until the user data can be correctly received by the mobile base station 10.

The frame data allocation unit 43 allocates user data to the frame, based on the control by the radio resource control unit 40, and outputs it as frame data.

The OFDMA data allocation unit 44 generates OFDMA data by allocating the frame data to a subcarrier and so on, based on the control by the radio resource control unit 40, and outputs the OFDMA data to the modulation processing unit 45.

The modulation processing unit 45 performs the modulation processing to the OFDMA data according to the timing signal output from the timing generation unit 41. The modulated OFDMA data is transmitted from the antenna 31 to the mobile base station 10 as the radio signal.

Figure 5:
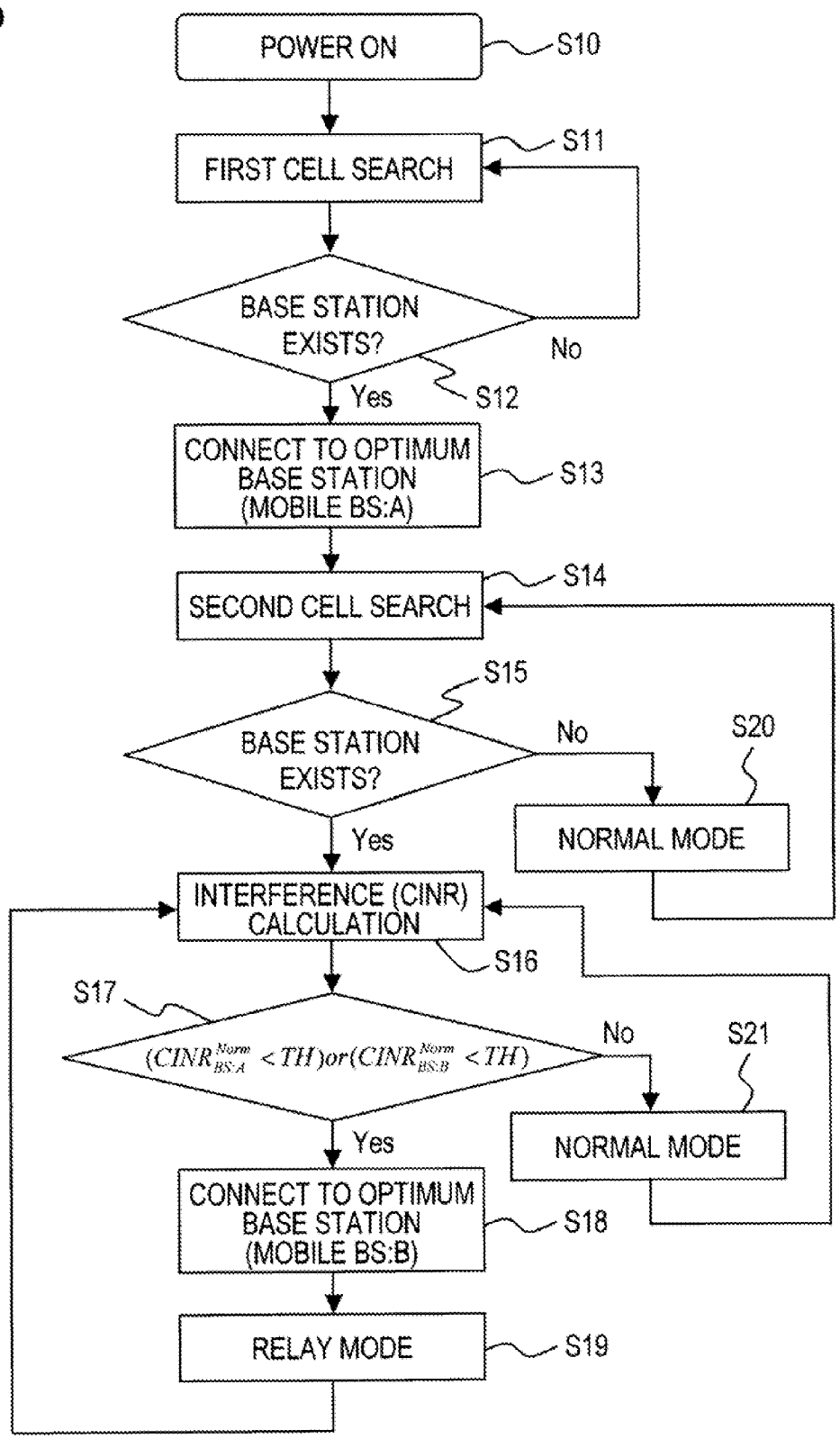
FIG. 5 is a flow chart depicting an operation example.

Next, the operation will be described. FIG. 5 is a flow chart depicting an operation example in the terminal 30.

The terminal 30 starts processing by power ON (S10).

Then the terminal 30 performs a first cell search (S11), and judges whether the mobile base station (serving BS) 10 to connect exists (S12). For example, the base station search processing unit 38 searches the pilot signal (or the known signal) which has a received power more than a threshold, out of the received powers of the pilot signals transmitted from each mobile base station 10.

If the mobile base station 10 to connect exists (YES in S12) in the first cell search, the terminal 30 connects the mobile base station (mobile BS:A) 10 (S13). For example, as a result of the first cell search, the terminal 30 connects the mobile base station 10 which received the pilot signal having the highest power value, out of the received powers exceeding the threshold. For example, the base station search processing unit 38 determines the mobile base station 10-A to connect, and reports the information thereof to the upper layer 37. The upper layer 37 performs connection processing, such as ranging, for the mobile base station 10-A.

If the mobile station 10 does not exist (NO in S12), on the other hand, the terminal 30 performs first cell search again (S11). For example, the base station search processing unit 38 performs first cell search again if there is no pilot signal that has the received power exceeding the threshold.

After connecting the mobile base station (mobile BS:A) 10 (S13), the terminal 30 performs the second cell search for the mobile base stations 10, other than the connected mobile base station (mobile BS:A) 10 (S14). For example, the base station search processing unit 38 compares the received power of the pilot signals transmitted from mobile base stations, other than the connected mobile base station 10-A.

Then the terminal 30 judges whether there is the mobile base station 10 to connect by the second cell search (S15). For example, the base station search processing unit 38 judges whether there is the pilot signal of which received power is more than the threshold.

If the mobile base station 10 to connect does not exist (NO in S15), the terminal 30 enters the normal mode (S20), and performs processing in S14 again. For example, the terminal 30-3 transmits and receives user data to and from the mobile base station 10-A connected by the first cell search.

If the mobile base station 10 to connect exists (YES in S15), on the other hand, the terminal 30 calculates interference (S16). For example, after connecting the mobile base station 10-A, the terminal 30-3 can be connected to the mobile base station 10-B by the group A and group B, which are becoming close to each other (see FIG. 3). At this time, for example, the base station search processing unit 38 searches the mobile base station 10-B which transmitted the pilot signal of which received power is the highest, other than the connected base station 10-A, and outputs the search result to the upper layer 37. The relay mode control unit 371 calculates interference based on the information. The relay mode control unit 371 calculates the interference, for example, a normalized CINR (Carrier to Interference plus Noise Ratio), between the two mobile stations 10-A and 10-B. The normalized CINR is a value considering the Required SNR of a physical communication channel allocated by the scheduler 22 of each base station 10-A and 10-B, for example. The base station search processing unit 38 measures the received power of each base station 10-A and 10-B, for example, and outputs the result to the relay mode control unit 371, and the relay mode control unit 371 calculates the normalized CINR based on the received power. An example of the calculation formula is as follows.

$$CINR_{BS:n}^{Norm} = P_{BS:n} - P_{BS:\neq n} - SNR^{Req}(MCS\#m, Channel\#k) - N^{Thermal} - NF [dB] \quad [\text{Expression 1}]$$

Here, $P_{BS:n}$=received power of BS:n $SNR^{Req}(MCS\#m, Channel\#k)$=Required SNR for MCS#m and Channel#k MCS#m=MCS allocated by BS:n Channel#k=Channel Condition with BS:n $N^{Thermal}$=Thermal Noise NF=Noise Figure  [Expression 2]

Then the terminal 30 compares the calculated two interferences with a threshold TH, which is predetermined considering an interference margin, and judges whether the following Expression 3 is satisfied (S17). For example, the relay mode control section 371 makes this judgment.

$$(CINR_{BS:A}^{Norm} < Th) \text{ or } (CINR_{BS:B}^{Norm} < TH)$$

If Expression 3 is not satisfied (NO in S17), the terminal 30 enters the normal mode (S21), and repeats the processing in S16. For example, if the received signal from the mobile base station 10-A is greater than the threshold and the received signal from the mobile base station 10-B does not cause interference, the normalized CINR becomes the threshold TH or more. In this case, the terminal 30-3 enters the normal mode. If the relay mode control unit 371 judges that Expression 3 is not satisfied, for example, the upper layer 37 executes processing to enter the normal mode.

If Expression 3 is satisfied (YES in S17), on the other hand, the terminal 30 performs processing to connect the mobile base station 10 based on the second cell search (S18), and enters the relay mode (S19). For example, if the received signal from the mobile base station 10-A to connect is smaller than the threshold and the received signal from the mobile base station 10-B causes interference, the normalized CINR becomes smaller than the threshold. In this case, the terminal 30-3 judges to be located in an interference range of the two mobile base stations 10-A and 10-B (e.g. in FIG. 2, range where communication ranges of group A and group B overlap), and performs radio connection to the second mobile base station 10-B, that is similar to the first mobile base station 10-A. Thereby the terminal 30-2 operates as a relay terminal of the two mobile base stations 10-A and 10-B. For example, the upper layer 37 performs connection processing, such as ranging, to the mobile base station 10-B, and the relay mode control unit 371 or the upper layer 37 based on the control by the relay mode control unit 371, generates a relay mode report message, and sends it to the mobile base stations 10-A and 10-B.

Even after the interference control state is established, the terminal 30 performs the interference calculation (S16) and threshold comparison (S17), and enters the normal mode (NO in S17, S21) when, for example, the distance of the two groups A and B is long and interference is lower than the threshold TH. When the terminal 30 becomes out of the interference range as well, the terminal 30 exits from the relay mode and enters the normal mode. If the terminal 30-3 cannot establish equal communication to a plurality of base stations 10-A and 10-B, another terminal 30-A1 that can establish such communication maintains established communication channels as a new relay terminal.

Figure 6:
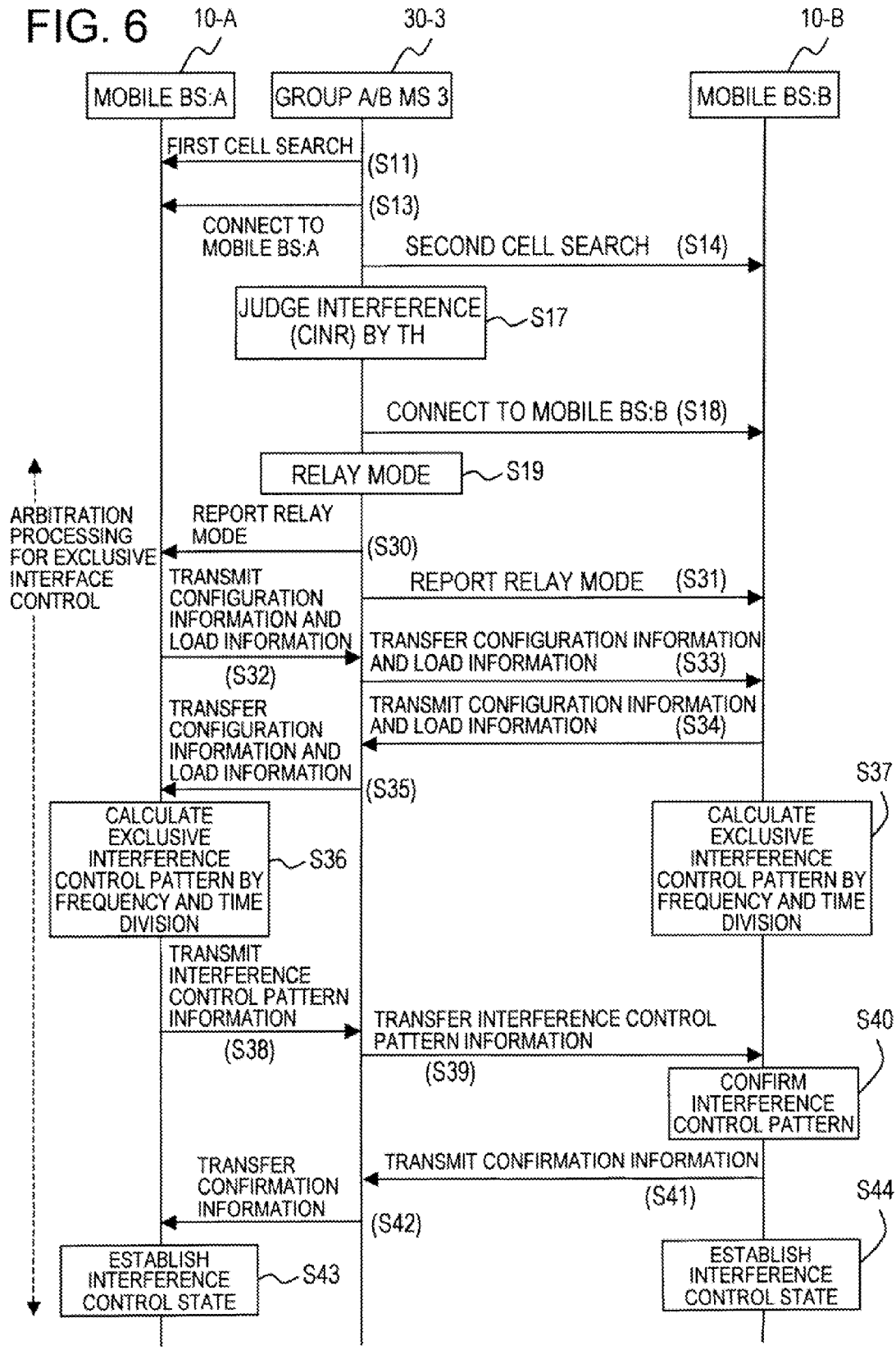
FIG. 6 is a sequence diagram depicting an operation example.

FIG. 6 is a diagram depicting an example of the message sequence in the radio communication system 1.

The terminal 30-3 performs first cell search and executes processing to connect the mobile base station (mobile BS:A) 10-A (S11 to S13).

Then the terminal 30-3 performs second cell search (S14) and judges interference (S15 to S17). If it is judged to be in the interference range, the terminal 30-3 executes processing to connect the mobile base station (mobile BS:B) 10-B (S18).

Then the terminal 30-3 enters the relay mode (S19), and sends the relay mode report message to the mobile base stations 10-A and 10-B (S30, S31). The terminal 30-3 operates as the relay station between the mobile base stations 10-A and 10-B, and contributes to arbitration processing for exclusive interference control.

When the relay mode report message is received, the mobile base station 10-A sends the configuration information that is used for operating radio communication of the mobile base station 10-A and the load information on the load state of the subordinate terminals to the mobile base station 10-B via the terminal 30-3 (S32, S33). For example, the configuration information includes information on the radio resources allocated to the mobile base station 10-A, central frequency, channel placement, number of symbols and the like. The load information includes, for example, a number of terminals to connect or the radio resource amount in the communication range, or the requested band from the terminal 30. For example, the upper layer 11 (or interference control unit 111) generates configuration information and load information, and sends them to the terminal 30-3. The terminal 30 receives the configuration information and load information, and transmits them to the mobile base station 10-B via the upper layer 37. The mobile base station 10-B receives the configuration information and load information and holds them in the interference control unit 111 (or in the upper layer 11).

Then the mobile base station 10-B transmits the configuration information and load information on the mobile base station 10-B to the mobile base station 10-A via the terminal 30-3 (S34, S35). For example, the interference control unit 111 of the mobile base station 10-B generates the configuration information and load information on the mobile base station 10-B, and transmits them to the mobile base station 10-A via the terminal 30-3. Thereby the two mobile base stations 10-A and 10-B share the configuration information and load information on the mobile base stations 10-A and 10-B respectively.

Figure 7:
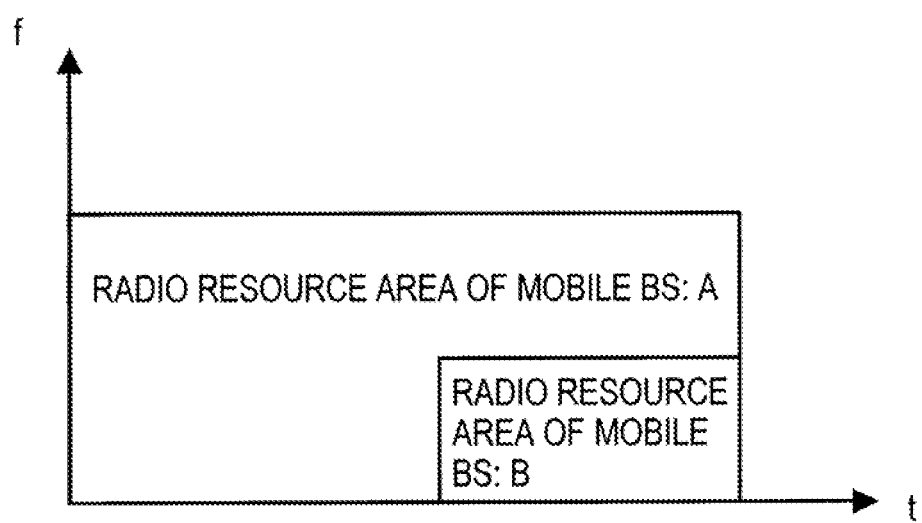
FIG. 7 is a diagram depicting an example of an exclusive interference control pattern.

Then each mobile base station 10-A and 10-B calculates the exclusive interference control pattern (S36, S37). The exclusive interference control pattern indicates, for example, a range of radio resources (e.g. frequency and time) usable by the two mobile base stations 10-A and 10-B, and an occupation range of each mobile base station 10-A and 10-B according to the load ratio. FIG. 7 is a diagram depicting an example of the exclusive interference control pattern. For example, the interference control unit 111 of the mobile base station 10-A calculates the radio resource amounts allocated to the two mobile base stations 10-A and 10-B based on the configuration information on the mobile base stations 10-A and 10-B. Then based on the radio resource amounts and load information on the mobile base stations 10-A and 10-B, the interference control unit 111 calculates the occupation range of the radio resource according to the ratio of the loads (or throughputs) of the mobile base stations 10-A and 10-B, to generate the exclusive interference control pattern. The interference control unit 111 of the mobile base stations 10-B also performs similar calculation.

Then the mobile base station 10-A transmits the exclusive interference control pattern to the mobile base station 10-B via the terminal 30-3 (S38, S39). For example, the interference control unit 111 transmits the generated exclusive interference control pattern via the data frame processing unit 12 and user data selection unit 13. The terminal 30-3 relays and transmits the received exclusive interference control pattern to the mobile base station 10-B. The interference control unit 111 of the mobile base station 10-B receives the exclusive interference control pattern.

Then the mobile base station 10-B confirms the exclusive interference control pattern (S40). For example, the interference control unit 111 compares the exclusive interference control pattern received from the mobile base station 10-A and exclusive interference control pattern that the mobile base station 10-B itself calculated, and confirms whether these patterns match.

After the confirmation, the mobile base station 10-B transmits the confirmation information message to the mobile base station 10-A via the terminal 30-3 (S41, S42). For example, if the interference control patterns match, the interference control unit 111 generates a confirmation information message, and transmits it to the mobile base station 10-A via the data frame processing unit 12 and user data selection unit 13.

Then the mobile base station 10-A received the information confirmation message, establishes the interference control state (S43). The mobile base station 10-B transmitted the confirmation information message, also establishes the interference control state (S44). For example, the interference control unit 111 of the mobile base station 10-A outputs the calculated exclusive interference control pattern to the scheduler 22 by inputting the information confirmation message. Based on the exclusive interference control pattern, the scheduler 22 allocates the radio resources. The scheduler 22 generates the MAP information in which the exclusive interference control patterns are added, and transmits it to the subordinate terminals 30-A1.

Figure 8:
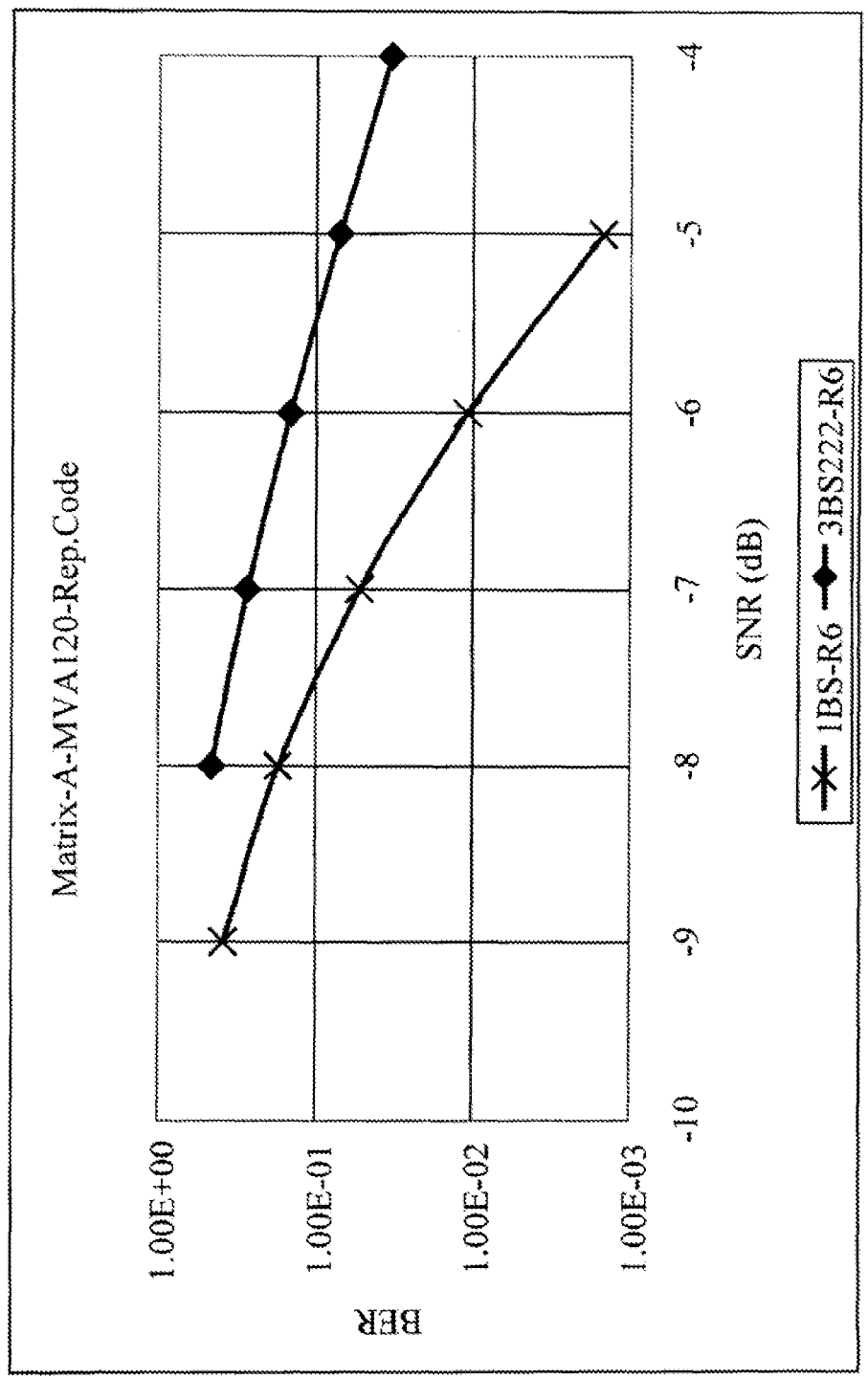
FIG. 8 is a graph depicting an example of the simulation result.

FIG. 8 is a graph depicting an example of the simulation result. The Y axis indicates an error rate (or throughput), and the X axis indicates a distance from the mobile base station 10. In FIG. 8, "1BS-R6" indicates the simulation result of the present embodiment, and "3BS222-R6" indicates the simulation result when three stations exist as the interference sources and the signal to interference ratio (CINR) is "−2.8 dB". When the SNR is "−6", the BER of the present embodiment is "1.00 E −01" lower than the case of not performing interference control. In other words, the interference control of the present embodiment can improve the communication quality by 10% compared with the case of not performing the interference control.

In this way, according to the present embodiment, the two mobile base stations 10-A and 10-B share the configuration information and load information by transmitting and receiving the respective information to and from each other, then generate the respective exclusive interference control patterns based on this information. The exclusive interference control patterns generated in this way are disposed so that the radio resources that can be used by the two mobile base stations 10-A and 10-B do not overlap. Therefore the mobile base stations 10-A and 10-B can perform radio communication with the terminal 30-A1 or the like with avoiding interference.

The exclusive interference control patterns are created after sharing the configuration information and load information, and are in accordance with the ratio of the loads of radio communication in the two mobile base stations 10-A and 10-B. Therefore the present embodiment can maximize the radio resource utilization efficiency in two mobile base stations 10-A and 10-B as a whole.

Connection of the terminal 30-3 to the second mobile base station 10 is not one of master and slave (master-slave relationship), but is the same as the connection to the first mobile base station 10-B. Hence a state where a part of the radio resources allocated only to the mobile base station 10-B, for example, cannot be used, can be avoided by the interference control, and the influence of radio resources can be provided equally to the two mobile base stations 10-A and 10-B.

Other Embodiments

In the description on each of the above embodiments, two mobile base stations 10-A and 10-B were used as an example. The embodiments can also be embodied with three or more mobile base stations 10, for example. In this case, the exclusive interference control pattern (e.g. FIG. 7) includes three or more areas.

In the description on the above embodiments, one terminal 30-3 is disposed in the interference range between the two mobile base stations 10-A and 10-B as an example. The embodiments can also be embodied for the case of two or more terminals 30, simultaneously moving to the interference range. For example, the mobile base stations 10-A and 10-B may determine one of the terminals 30 as the relay terminal.

In the description on the second embodiment, the mobile base station 10-A transmits the configuration information and load information before the mobile base station 10-B transmits (S32 to S35 in FIG. 6). But the mobile base station 10-B may transmit the configuration information and the load information before the mobile base station 10-A transmits. The interference control pattern may also be transmitted to the mobile base station 10-A by the mobile base station 10-B first, and then transmitted to the mobile base station 10-B by the mobile base station 10-A. In this case, the mobile base station 10-A may confirm the interference control pattern, and transmit the confirmation message.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication method for performing a radio communication between a first and second movable base station apparatuses and a subordinate terminal apparatus respectively, the method comprising:
   transmitting and receiving configuration information including radio resource and load information relating the subordinate terminal apparatus in the first and second movable base station apparatuses respectively, via the subordinate terminal apparatus located in an overlapped communicable range of the first and second movable base station apparatuses, when the first and second movable base station apparatuses perform radio communication using a same radio resource, by the first and second movable base station apparatuses respectively; and performing interference control based on the configuration information and the load information, by the first and second movable base station apparatuses respectively.

2. The radio communication method according to claim 1, further comprising;

generating interference control information for avoiding interference based on the configuration information and the load information, and transmitting and receiving mutually the interference control information via the subordinate terminal apparatuses located in the overlapped communication range, by the first and second movable base station apparatuses; and allocating different radio resource based on the interference control information and performing radio communication with the subordinate terminal apparatuses, by the first and second movable base station apparatuses.

3. The radio communication method according to claim 1, further comprising connecting to the first and second movable base station apparatuses equally by the subordinate terminal apparatus when the subordinate terminal apparatus is located in the overlapped communication range.

4. The radio communication method according to claim 1, further comprising connecting by the subordinate terminal apparatus to the first and second movable base station apparatuses equally, when the subordinate terminal apparatus judges that radio communication of the first movable base station apparatus is interfered with by the radio communication of the second movable base station apparatus.

5. The radio communication method according to claim 1, further comprising radio connecting with the second movable base station apparatus equally with the first movable base station apparatus, when the subordinate terminal apparatus judges that a radio signal of the second movable base station apparatus is interfered with the first movable base station apparatus after radio connecting with the first movable base station apparatus.

6. The radio communication method according to claim 2, wherein the first and second movable base station apparatuses generate interference control information according to a ratio of load relating the subordinate terminal apparatus, respectively.

7. The radio communication method according to claim 2, wherein the interference control information indicates a radio resource occupation range of the first and second movable base station apparatuses according to a ratio of loads on each of the subordinate terminal apparatuses communicating with the first and second movable base station apparatuses.

8. The radio communication method according to claim 1, wherein the load information includes the number of the subordinate terminal apparatus, amount of radio resource for the subordinate terminal apparatus, or band request by the subordinate terminal apparatus.

9. A movable base station apparatus for performing radio communication with a terminal apparatus, the movable base station apparatus comprising:

a transmission and reception unit which transmits to an other movable base station apparatus, configuration information relating to the radio resource of the movable base station apparatus and load information relating to the subordinate terminal apparatus, via the subordinate terminal apparatus located in an overlapped communication range with the other movable base station apparatus, when the movable base station apparatus performs radio communication with the other movable base station apparatus using the same radio resource, and receives from the other movable base station apparatus the configuration information and the load information relating to the other movable base station apparatus; and an interference control unit which performs interference control based on the configuration information and load information relating to the movable base station apparatus and the configuration information and load information relating to the other movable base station apparatus.

* * * * *